United States Patent
Hidaka et al.

(10) Patent No.: US 10,525,501 B2
(45) Date of Patent: Jan. 7, 2020

(54) ROLLER TRANSFER APPLICATION METHOD AND APPLICATION DEVICE FOR HOT-MELT ADHESIVE

(71) Applicant: Sun Tool Corporation, Moriguchi shi, Osaka (JP)

(72) Inventors: Shoji Hidaka, Moriguchi (JP); Hisashi Sakai, Moriguchi (JP); Seiki Tarumi, Moriguchi (JP)

(73) Assignee: SUN TOOL CORPORATION, Osaka (JP)

( * ) Notice: Subject to any disclaimer, the term of this patent is extended or adjusted under 35 U.S.C. 154(b) by 0 days.

(21) Appl. No.: 15/311,810

(22) PCT Filed: Aug. 22, 2014

(86) PCT No.: PCT/JP2014/072667
§ 371 (c)(1),
(2) Date: Nov. 16, 2016

(87) PCT Pub. No.: WO2015/177943
PCT Pub. Date: Nov. 26, 2015

(65) Prior Publication Data
US 2017/0080454 A1  Mar. 23, 2017

(30) Foreign Application Priority Data
May 17, 2014  (JP) ................ 2014-102918

(51) Int. Cl.
*B05D 7/24*  (2006.01)
*B05D 5/00*  (2006.01)
(Continued)

(52) U.S. Cl.
CPC ........... *B05D 1/28* (2013.01); *B05D 5/00* (2013.01); *B05D 7/24* (2013.01); *C09J 5/00* (2013.01); *C09J 2201/61* (2013.01)

(58) Field of Classification Search
CPC ........ B05D 1/28; B05D 5/00; B32B 37/1284; C09J 5/00; B05C 1/083; B05C 1/165; B05C 1/0813
See application file for complete search history.

(56) References Cited

U.S. PATENT DOCUMENTS 4,990,079 A * 2/1991 Lorenz ................ B29C 47/0816
425/141
6,033,513 A  3/2000 Nakamura
(Continued)

FOREIGN PATENT DOCUMENTS

JP           52834 A    1/1977
JP      H02-083058 A   3/1990
(Continued)

OTHER PUBLICATIONS

International Search Report (PCT/ISA/210) dated Jan. 6, 2015 for corresponding PCT Application PCT/JP2014/072667 cites the U.S. And foreign patent and publication documents.
(Continued)

*Primary Examiner* — Francisco W Tschen
(74) *Attorney, Agent, or Firm* — Norton Rose Fulbright US LLP

(57) ABSTRACT

In a roller transfer application method for a hot-melt adhesive, a coater head having a slot in a direction towards an axis center of a pattern roller is provided to face a pattern surface of the pattern roller; and by supplying hot-melt adhesive, which is supplied from a hot-melt adhesive supply device, in a thin-film state to a pattern top surface of the pattern roller, thin-film hot-melt adhesive is thus only supplied to the top surfaces of protrusions of the pattern roller. By opening an on-off-type hot-melt adhesive supply control valve, which is attached to the coater head, at a timing that an adhesive opening (the slot) on the bottom surface of the coater head faces application zones on the pattern surface of
(Continued)

the pattern roller, the hot-melt adhesive is supplied only to the top surfaces of the pattern roller protrusions.

11 Claims, 8 Drawing Sheets

(51) Int. Cl.
*C09J 5/00* (2006.01)
*B05C 1/16* (2006.01)
*B05C 1/08* (2006.01)
*B05D 1/28* (2006.01)

(56) References Cited

U.S. PATENT DOCUMENTS

| | | | |
|---|---|---|---|
| 6,074,480 A * | 6/2000 | Kakuta | B05C 1/0834 118/249 |
| 6,472,025 B1 | 10/2002 | Guldbrandsen et al. | |
| 2003/0119404 A1 * | 6/2003 | Belau | A44B 18/0011 442/361 |
| 2004/0134596 A1 * | 7/2004 | Rosati | B05C 1/0813 156/230 |
| 2009/0170413 A1 * | 7/2009 | Hsu | B24B 37/22 451/533 |
| 2011/0311715 A1 * | 12/2011 | Jackson | B05C 5/0262 427/8 |
| 2012/0316523 A1 * | 12/2012 | Hippe | A61F 13/514 604/361 |

FOREIGN PATENT DOCUMENTS

| | | |
|---|---|---|
| JP | H05-161863 A | 6/1993 |
| JP | 10235278 A | 9/1998 |
| JP | 10277455 A | 10/1998 |
| JP | 1142461 A | 2/1999 |
| JP | 2002-045782 A | 2/2002 |
| JP | 2002273302 A | 9/2002 |
| JP | 2005507306 A | 3/2005 |
| JP | 200769125 A | 3/2007 |
| JP | 4805502 B2 | 11/2011 |
| JP | 2013534460 A | 9/2013 |

OTHER PUBLICATIONS

Examination Report No. 2 dated Feb. 15, 2018 to corresponding Australian Patent Application No. 2014394518, citing the art listed above.

Supplementary European Search Report dated Nov. 23, 2017 to corresponding EPC Application No. 14892519, citing the art listed above.

* cited by examiner

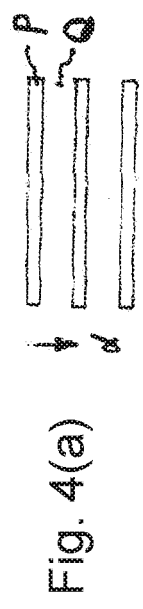
Fig. 4(a)
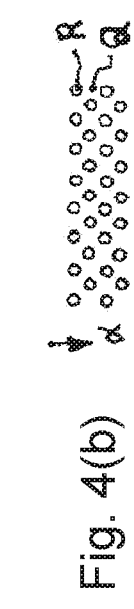
Fig. 4(b)
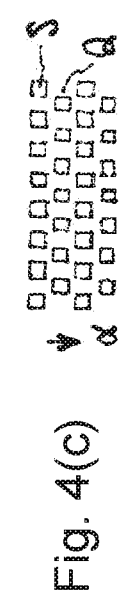
Fig. 4(c)
Fig. 4(d)
Fig. 4(e)
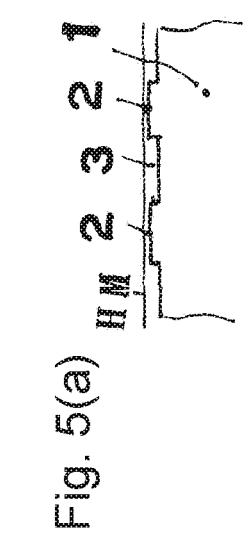
Fig. 5(a)
Fig. 5(b)
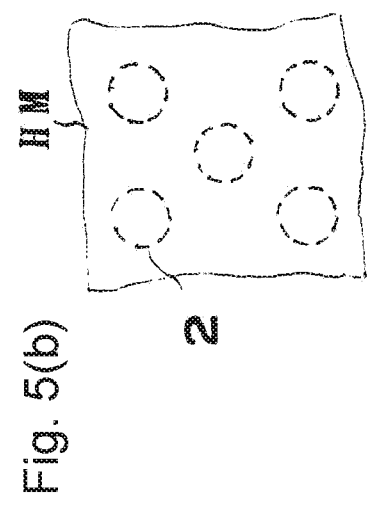
Fig. 6(a)
Fig. 6(b)

ROLLER TRANSFER APPLICATION METHOD AND APPLICATION DEVICE FOR HOT-MELT ADHESIVE

CROSS REFERENCE TO RELATED APPLICATIONS

This application is a National Stage of International Application No. PCT/JP2014/072667 filed on Aug. 22, 2014 and claims the benefit of priority under 35 USC 119 of Japanese Patent Application No. 2014-102918, filed on May 17, 2014, which is incorporated herein by reference.

TECHNICAL FIELD

The present invention relates to a roller transfer application method for a hot-melt adhesive and more specifically to a roller transfer application method for an adhesive, including applying an adhesive to a protrusion pattern surface of an application roller having a surface on which a protruding face of a desired pattern is formed, and transferring and applying the adhesive to a surface of a flexible application object such as paper or a plastic film which moves in contact with the application roll.

BACKGROUND ART

With regard to a roller transfer application method for an adhesive, there is known a roller transfer application method for a hot-melt adhesive, including means of applying a hot-melt adhesive fed from a hot-melt adhesive feeder to a protrusion pattern surface of a pattern roller in which a protrusion pattern is formed, means of transferring the hot-melt adhesive applied to protrusions of the pattern roller from the protrusion surface of the pattern roller to a surface of an application substrate by moving the application substrate sandwiched between the pattern roller and an impression roller and brought into pressure contact with the pattern roller and the impression roll, and means of bonding the application substrate having the surface applied with the adhesive to a bonded material.

CITATION LIST [PATENT LITERATURES]

Patent Literature 1: Japanese Patent Application Laid-Open No. 10-235278
Patent Literature 2: Japanese Patent Application Laid-Open No. 10-277455
Patent Literature 3: Japanese Patent Application Laid-Open No. 11-42461

SUMMARY OF THE INVENTION

Technical Problems

In "a roll coater having a rubber transfer roll and an application method using the same" in Patent Literature 1 (Japanese Patent Application Laid-Open No. 10-235278), a decorative application film is formed on a substrate surface by using a mesh roller having a mesh-like grooves formed therein, and via a rubber transfer roll.

Patent Literature 1 is technique of feeding paint fed from a fuel tank to the substrate surface at a predetermined film thickness, and does not disclose technique of feeding a hot-melt adhesive in a thin film state.

Moreover, in Patent Literature 1, the hot-melt adhesive is exposed on a route to the substrate surface. Consequently, Patent Literature 1 has problems of mixing of dust and other impurities into the hot-melt adhesive to be applied to the substrate surface, and a temperature change or deterioration of the hot-melt adhesive.

"An adhesive application method and an adhesive application device" in Patent Literature 2 (Japanese Patent Application Laid-Open No. 10-277455) is technique of feeding a hot-melt adhesive to protruding faces of a second roller (transfer roller), and consequently applying the hot-melt adhesive to a substrate with a predetermined pattern. However, the hot-melt adhesive is fed via a first roller (mesh roller). Consequently, an application face having a constant film thickness is to be formed.

Therefore, as with Patent Literature 1, Patent Literature 2 does not disclose technique for feeding a hot-melt adhesive in a thin film state.

Moreover, as with Patent Literature 1, in Patent Literature 2, the hot-melt adhesive is exposed on a route to a substrate surface. Consequently, Patent Literature 2 has problems of mixing of dust and other impurities into the hot-melt adhesive to be applied to the substrate surface, and a temperature change or deterioration of the hot-melt adhesive.

"A roll transfer coating application method for hot-melt adhesive" in Patent Literature 3 (Japanese Patent Application Laid-Open No. 11-42461) discloses "a roller transfer application method for an adhesive, including means of applying a hot-melt adhesive fed from a hot-melt adhesive feeder to protrusion pattern surfaces of an application roller in which a protrusion pattern is formed, via a slot nozzle equipped with a smoother roll, means of transferring the hot-melt adhesive applied to the protrusions of the application roller from the protrusion surfaces of the application roller to the surface of an object to which application is made by moving the object sandwiched between the application roller and an impression roller and brought into pressure contact with the application roller and impression roll, and means of blowing hot air for accelerating the transfer of the hot-melt adhesive toward a hot-melt adhesive transfer region sandwiched between the application roller and the impression roller in a direction counter to a roller rotating direction."

As means of applying the hot-melt adhesive to the application roller in which the protrusion pattern is formed, the slot nozzle equipped with the smoother roller is used. Paragraph [0020] in Patent Literature 3 describes the slot nozzle equipped with the smoother roller as follows. With reference to FIG. 12, when the hot-melt adhesive melted in a hot-melt adhesive feeder 100 is fed to a slot nozzle 104 via a duct 1099, the hot-melt adhesive 100 is applied to surfaces of protrusions 2 of an application roller 1A rotating substantially in contact with a smoother roller 105 provided at a tip end of the slot nozzle 104. Moreover, when a recess 3 of the application roller 1A reaches a tip end portion of the slot nozzle 104, i.e., the smoother roller 105 portion, the hot-melt adhesive 100 is forcibly circulated from an adhesive return path 107 of the slot nozzle 4 to the hot-melt adhesive feeder 100 by a gear pump 10 and a duct 111.

As means of forcibly circulating the hot-melt adhesive applied to the recess 3 of the application roller 1A to the hot-melt adhesive feeder 100, the smoother roller 105 having the adhesive return path 107 and the gear pump 110 attached thereto is mounted.

The smoother roller 105 cannot reliably and forcibly circulate the applied hot-melt adhesive from the recess 3 of the application roller 1A rotating at high speed to the hot-melt adhesive feeder 8.

Accordingly, an object of the invention of the present patent application is to apply a hot-melt adhesive in a thin film state only to surfaces of protrusions 2 so as to make the smoother roller 105 unnecessary.

Further, an object of the invention of the present patent application is to feed the hot-melt adhesive only to protruding faces of a hot-melt adhesive application zone, as necessary to form a non-application zone in a part of a substrate surface of a half-finished product.

Solutions to Problems

A first aspect of the invention of the present patent application provides a roller transfer application method for a hot-melt adhesive, including a step of transferring a hot-melt adhesive applied to a protrusion of a pattern roll, from a protrusion surface of the pattern roller to a surface of an application substrate, wherein the hot-melt adhesive in a thin film state is fed only to the protrusion surface of the pattern roller by providing a coater head having a slot groove in an axial direction of the pattern roller to face a pattern face of the pattern roller, and feeding the hot-melt adhesive fed from a hot-melt adhesive feeder, in a thin film state to a pattern surface of the pattern roller.

A second aspect of the invention of the present patent application provides a roller transfer application method for a hot-melt adhesive, including a step of transferring a hot-melt adhesive applied to a protrusion of a pattern roller, from a protrusion surface of the pattern roller to a surface of an application substrate, wherein the hot-melt adhesive is fed only to the protrusion surface of the pattern roller by using the pattern roller having a roller surface on which an application zone including the protrusion and a recess and a non-application zone without the protrusion are formed, providing a coater head having a slot groove in an axial direction of the pattern roller to face a pattern face of the pattern roller, feeding the hot-melt adhesive fed from a hot-melt adhesive feeder toward a pattern surface of the pattern roller, and performing opening actuation of an ON/OFF hot-melt adhesive feed control valve to which the coater head is attached, at the timing of an adhesive opening of a bottom face of the coater head to face the application zone of the pattern face of the pattern roller.

A third aspect of the invention of the present application provides a roller transfer application method for a hot-melt adhesive, including a step of transferring a hot-melt adhesive applied to a protrusion of a pattern roll, from a protrusion surface of the pattern roll to a surface of an application substrate, wherein a coater head having a slot groove in an axial direction of the pattern roller is provided to face a pattern face of the pattern roller, the hot-melt adhesive fed from a hot-melt adhesive feeder is fed in a thin film state to a pattern surface of the pattern roller, the pattern roller having a roller surface on which an applied area including the protrusion and a recess and an un-applied area without the protrusion is provided, an ON/OFF hot-melt adhesive feed control valve that is subjected to opening actuation at the timing of an adhesive opening of a bottom face of the coater head to face the application zone of the pattern face of the pattern roller is provided, the hot-melt adhesive discharged through the adhesive opening of the coater head is fed only to the applied area of the roller surface of the pattern roller, and the hot-melt adhesive in a thin film state is fed only to the protrusion surface of the pattern roller.

Advantageous Effects of Invention

The present invention has an effect that is not disclosed in the inventions in Patent Literature 1, Patent Literature 2, and Patent Literature 3, and the effect of the present invention is of reducing an application amount of a hot-melt adhesive to a substrate by feeding the hot-melt adhesive in a thin film state to a protruding face of a pattern roller.

Further, the hot-melt adhesive is directly applied to the protruding face of the pattern roller. Consequently, when roller transfer application of the hot-melt adhesive is performed, a transfer roller and an adhesive storing portion do not exist. Accordingly, due to absence of a portion where the hot-melt adhesive is exposed and stays, there is no deterioration or generation of oily smoke by overheating of the hot-melt adhesive, and no dispersion of volatile components of the hot-melt adhesive. Consequently, the present invention has an effect of maintaining a favorable work environment by preventing contamination of surroundings of the device.

Moreover, it is possible to stop the feeding of the hot-melt adhesive from the coater head in the roller transfer application of the application area including only the recess face (the application face including the non-application zone) while applying the hot-melt adhesive in the thin film state only to the protruding face to thereby obtain the desired application face.

BRIEF DESCRIPTION OF THE DRAWINGS

FIGS. 4(*a*) to 4(*e*) are partial plan views of a pattern roll surface, showing an embodiment of a protrusion pattern of a pattern roll.

FIGS. 5(*a*) and 5(*b*) are views showing a principle of the invention of the present application and explaining the timing of applying a hot-melt adhesive to the pattern roll surface by the coater head, wherein FIG. 5(*a*) is a sectional schematic view and FIG. 5(*b*) is a partial plan view.

FIGS. 6(*a*) and 6(*b*) are views explaining the timing of completing application of the hot-melt adhesive to protrusions, wherein FIG. 6(*a*) is a sectional schematic view and FIG. 6(*b*) is a partial plan view.

EMBODIMENTS TO CARRY OUT INVENTION

Figure 1:
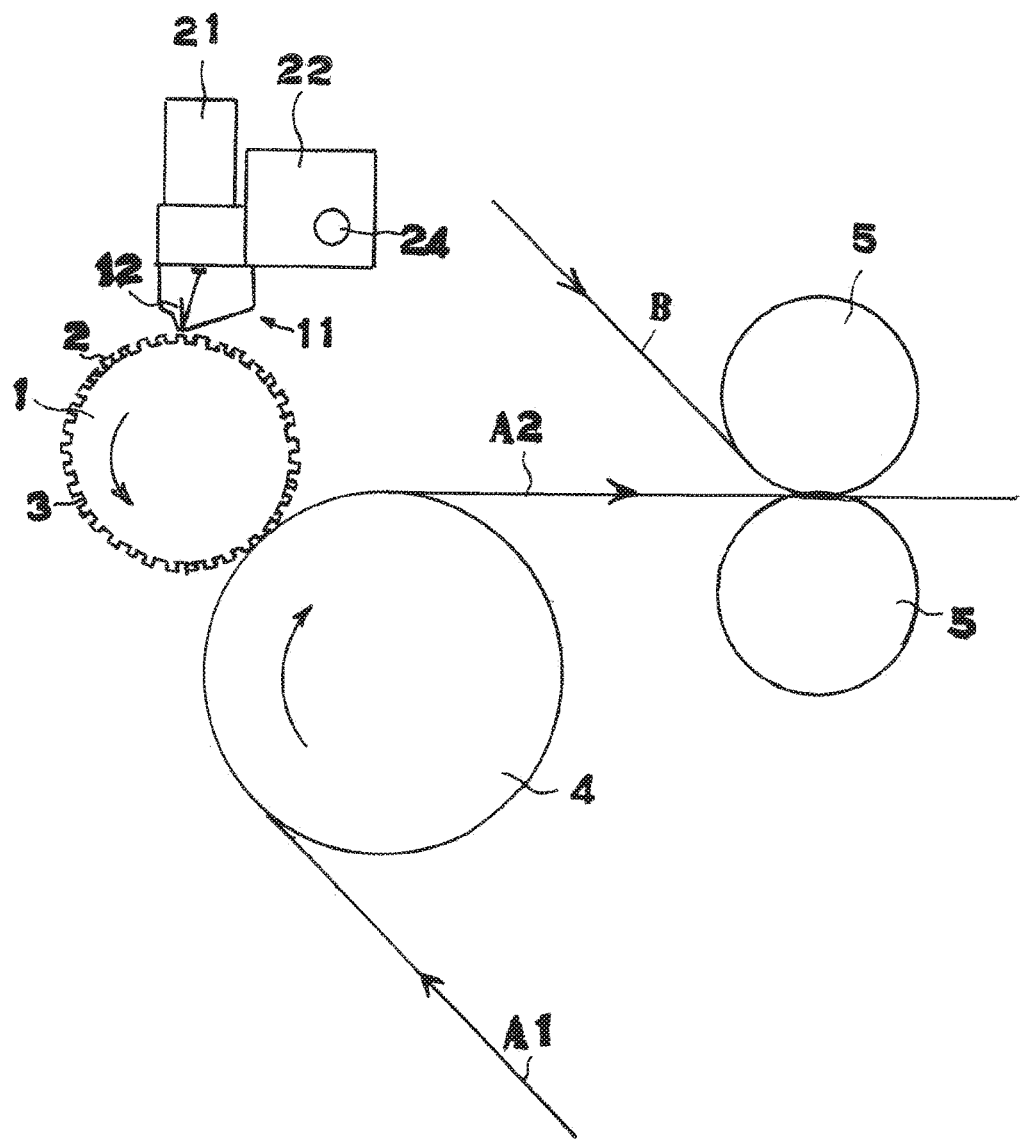
FIG. 1 is a schematic view of a roller transfer application device for a hot-melt adhesive, showing a first embodiment of the invention of the present patent application.

A roller transfer application method for a hot-melt adhesive according to the first aspect of the invention of the present patent application and a roller transfer application device for a hot-melt adhesive according to the third aspect of the invention of the present patent application will be described based on a first embodiment of the present patent application shown in FIGS. 1 to 4.

A hot-melt adhesive HM fed from a hot-melt adhesive feeder 10 is applied to protrusion surfaces of a pattern surface of a pattern roller 1 in which protrusions 2 and recesses 3 are formed.

An application substrate M1 sandwiched between the pattern roller 1 in which the protrusions and the recesses are formed and an impression roller 4 and brought into pressure contact with the pattern roller 1 and the impression roller 4 is moved.

The hot-melt adhesive HM applied to the protrusion surfaces of the pattern roller is transferred from the protrusion surfaces of the pattern roller to a surface of an application substrate A1 by moving the application substrate A1 sandwiched between the pattern roller 1 and the impression roller 2 and brought into pressure contact with the pattern roller 1 and the impression roller 2.

An application substrate A2 having a surface applied with the adhesive and a bonded material B are bonded to each other by a pair of nip rolls 5 and 5.

Figure 2:
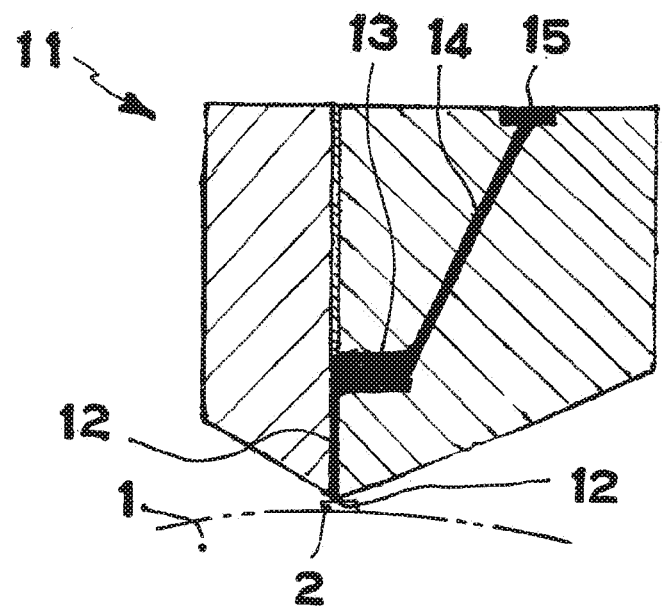
FIG. 2 is a longitudinal sectional view of a coater head.
Figure 3:
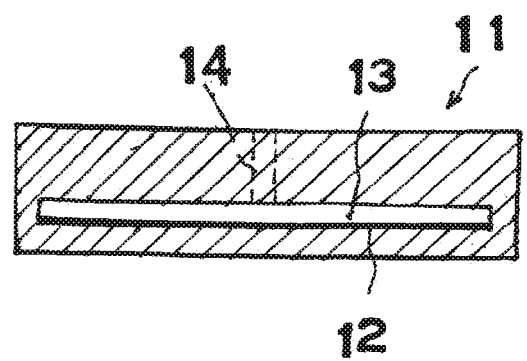
FIG. 3 is a cross sectional view of the coater head.
Figure 7:
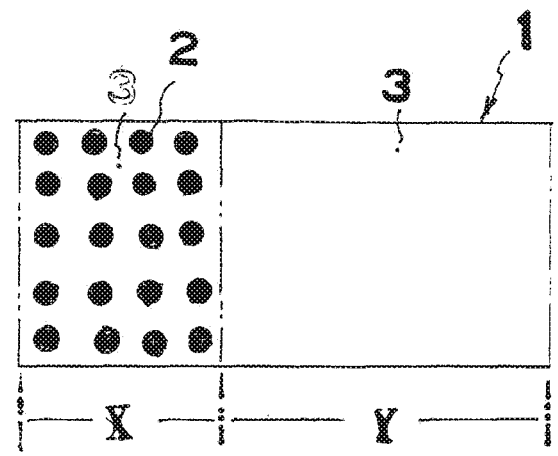
FIG. 7 is a developed view of a roller face of a pattern roller in a second embodiment, showing distribution of an application zone and a non-application zone.

A coater head 11 shown in FIGS. 2 and 3 is mounted to the hot-melt adhesive feeder 10. A gun module 21 having a valve mechanism and a manifold 22 having a heating hose receiving hole 24 are provided continuously with the coater head 11. The heating hose receiving hole 24 of the manifold 22 communicates with the hot-melt adhesive feeder (not shown) including an adhesive tank and a pressure pump, via a heating hose connected to the heating hose receiving hole 24.

Thus, the hot-melt adhesive fed to the heating hose receiving hole 24 of the manifold 22 by the hot-melt adhesive feeder (not shown) is fed to an adhesive inlet 15 of the coater head 11 via the valve mechanism 6 of the gun module 21.

A slot groove (adhesive hole) 12 has a shape of a slit in an axial direction of the pattern roller and having a narrow section. An opening 12a at a lower end of the slot groove 12 faces a pattern face of the pattern roller 1, and a small clearance is formed between the opening 12a and the protrusion surface 2 of the pattern roller 1.

FIGS. 4(*a*) to 4(*e*) each show an example of distribution of the protrusion surfaces 2 of the pattern roll 1 in a protruding face pattern view.

In FIG. 4(*a*), protruding straight lines P and recessed straight lines (blank lines) Q exist alternately in an application traveling line direction (α). In a direction (a longitudinal direction of the slid groove) orthogonal to the application traveling line direction (α), the same line exists. In other words, the protruding straight lines P exist at constant intervals in the application traveling line direction (α).

In FIG. 4(*b*), protruding circles R are arranged in a staggered arrangement. In FIG. 4(*c*), protruding squares S are arranged in a lattice-like arrangement. In each arrangement, recessed portions (blank portions) Q exist in both of the application traveling line direction (α) and the orthogonal direction (the longitudinal direction of the slit groove).

In (d) and (e) FIGS. 4(*d*) and 4(*e*), successively repeated graphics T or U in which protruding face portions and recessed face portions are mixed alternately are arranged successively in the application traveling line direction (α).

Next, application operation according to the first aspect of the invention of the present patent application will be described.

A principle of the invention of the present patent application is as follows. The slot groove (adhesive hole) 12 of the coater head is a hole which has an extremely narrow width (set by the thickness of a shim plate) and which is long in a direction orthogonal to a substrate carrying direction. Accordingly, the hot-melt adhesive fed through the slot groove forms a full application face at an extremely small film thickness (5 microns (μ) to 30μ) on the surface of the pattern roller (see FIG. 6).

Next, the hot-melt adhesive facing the recesses of the pattern roll is drawn and integrated into the hot-melt adhesive facing and adhering to the protrusions of the pattern roll. As a result, the hot-melt adhesive is applied only to the protrusion surfaces and does not adhere to the recesses. In other words, the hot-melt adhesive is applied only to the protrusion surfaces (see FIGS. 6(*a*) and 6(*b*)).

The case in which the full application face is formed at an extremely small film thickness (5μ to 30μ) on the surface of the pattern roll is described in FIGS. 5(*a*) to 6(*b*). However, when the slot groove (adhesive hole) 12 of the coater head has an even narrower width (e.g., when the thickness of the shim plate inserted between left and right half coater head bodies for forming the slot groove (adhesive hole) 12 of the coater head is 0.2 mm) and when the protrusion surfaces are in contact with the opening of the slot groove (adhesive hole) 12 of the coater head or a clearance between the protrusion surfaces and the opening is extremely small, an outflow of the adhesive through the slot groove (adhesive hole) 12 of the coater head is small and the adhesive exudes. The hot-melt adhesive adheres only to the protrusion surfaces in the surface of the pattern roll and does not adhere to the recesses.

Moreover, since a set position of the coater head can be freely selected from a 360-degree range with respect to a peripheral face of the pattern roller, it is effective to set the opening in an upward oriented range in the above-described case.

When the present invention is carried out, the hot-melt adhesive is likely to adhere to the surfaces of the recesses 3 in a case where a discharge amount of the hot-melt adhesive is large, for example, a case where the total area of surfaces of the recesses 3 of the pattern roller increase.

As a countermeasure to the above, it is necessary to reduce the discharge amount of the hot-melt adhesive.

Means of reducing the discharge amount of a hot-melt adhesive HM-2 is to increase a rotation speed of the pattern roller in response to increase in the total area of the recess pattern surfaces of the pattern roller with respect to the total area of the protrusion pattern surfaces of the pattern roller, and as a result, to respond to the increase in the recess pattern surfaces of the pattern roller with reduction in the discharge time of the hot-melt adhesive.

Further, the discharge amount of the hot-melt adhesive can be changed by the following condition changes, and set values are suitably selected.

1. The discharge amount of the adhesive from a slot die can be changed by a rotation speed of an adhesive feed pump of the hot-melt adhesive feeder.

2. Adjustment of the small clearance between the protrusion pattern surfaces of the pattern roller and the opening of the adhesive hole of the slot die.

3. A temperature of a hot-melt feed path of the hot-melt adhesive feeder.

4. The width of a section of the adhesive in the slot die.

Effective Example 1

A protrusion and recess pattern: straight protrusions are arranged at constant intervals in a rotating direction and throughout the width in an axial direction.

The protrusions and recesses are arranged alternately in the rotating direction at intervals of 7.2 mm.

The width of each of the protrusions is 1 mm.

The height of each of the protrusions is 1 mm.

The application face on the application substrate: application straight lines having the width of 1 mm at intervals of 7.2 mm in a traveling direction of the application line.

The film thickness of the application face: 5μ to 30μ.

The opening of the slit (adhesive hole) of a bottom face of the slot die: a rectangle of 90 mm×0.2 mm.

The rotation speed of an adhesive feed pump of the hot-melt adhesive feeder: 19 rpm.

The clearance between the protrusion pattern surface of the pattern roller and the opening of the adhesive hole of the slot die: 0.015 to 0.05 mm.

The temperature of the hot-melt feed path of the hot-melt adhesive feeder: 160° C.

A temperature of the pattern roller: 130° C. to 60° C.

Effective Example 2

The protrusion and recess pattern: the circular protrusions are arranged in the staggered arrangement.

The protrusions and the recesses are arranged alternately at intervals of 4 mm in the axial direction.

The protrusions and the recesses are arranged alternately at intervals of 5 mm in the rotating direction.

A diameter of each of the protrusions: 2 mm.

The height of each of the protrusions: 1 mm.

The application face on the application substrate: application straight lines having the width of 40 mm at intervals of 5 mm in the traveling direction of the application line.

The film thickness of the application face: 5μ to 30μ.

The opening of the slit (adhesive hole) of the bottom face of the slot die: a rectangle of 90 mm×0.2 mm.

The rotation speed of the adhesive feed pump of the hot-melt adhesive feeder: 10 rpm.

The clearance between the protrusion pattern surface of the pattern roller and the opening of the adhesive hole of the slot die: 0.015 to 0.05 mm.

The temperature of the hot-melt feed path of the hot-melt adhesive feeder: 160° C.

The temperature of the pattern roller: 130° C. to 65° C.

The above-described effective examples each describe an example of the application conditions, and do not describe restrictive conditions.

Next, an example of application conditions for an application failure will be described.

Reference Example 1

In the first embodiment, when the rotation speed of the pattern roller was 38 rpm, a part of the hot-melt adhesive came in contact with the surfaces of the recesses, and the application failure was caused.

Reference Example 2

In a second embodiment, when the rotation speed of the adhesive feed pump of the hot-melt adhesive feeder was 30 rpm and the clearance between the protrusion pattern surface of the pattern roller and the opening of the adhesive hole of the slot die was 0.1 mm, a part of the hot-melt adhesive came in contact with the surfaces of the recesses, and the application failure was caused.

In view of the above-described cases, in order to apply the hot-melt adhesive only to the protrusion pattern surfaces of the pattern roller according to the present invention, it is estimated that the clearance between the protrusion pattern surface of the pattern roller and the opening of the adhesive hole of the slot die is preferably set to be extremely small or almost nonexistent, and the film thickness of the application face is preferably set to be extremely small.

Hereinafter, the second aspect and the third aspect of the invention of the present patent application will be described based on the second embodiment shown in FIGS. 7 to 11.

In the second embodiment, an application zone X including protrusions and recesses and a non-application zone Y without the protrusion are formed in a rotating direction of a pattern roller on the roller surface of the pattern roller in the first embodiment. In other words, an application face of a substrate is formed to obtain such distribution of protrusion surfaces 2 that one or more application zones X where the protrusion surfaces 2 are scattered and one or more non-application zones Y without the protrusion surface 2 are mixed in a vertical direction of the substrate (a traveling direction of the substrate) (see FIG. 7).

When a hot-melt adhesive in a thin film state is fed to the roller surface of the pattern roller, the hot-melt adhesive in a thin film state is fed only to the application zone X of the roller surface of the pattern roller.

Figure 8:
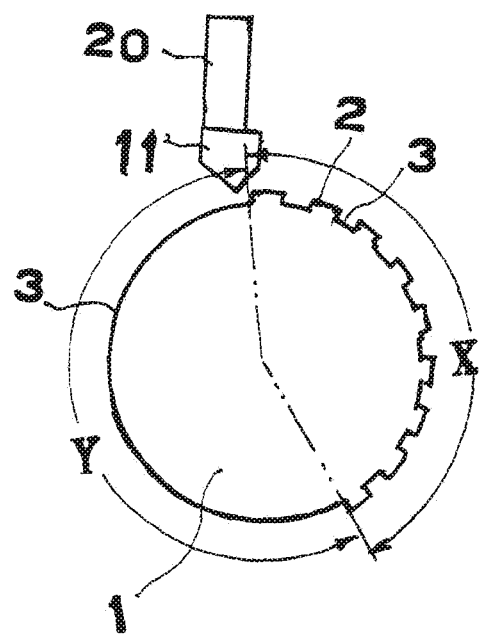
FIG. 8 is a longitudinal sectional view of the pattern roller.

The hot-melt adhesive is fed only to the application zone X of the pattern roller by performing opening actuation of an ON/OFF hot-melt adhesive feed control valve 20 to which a coater head is attached, at the timing of an adhesive opening of a bottom face of the coater head to face the application zone X of the pattern face of the pattern roller (see FIG. 8).

The hot-melt adhesive discharged through the adhesive opening of the coater head is fed only to the application zone of the roller surface of the pattern roller.

Figure 9:
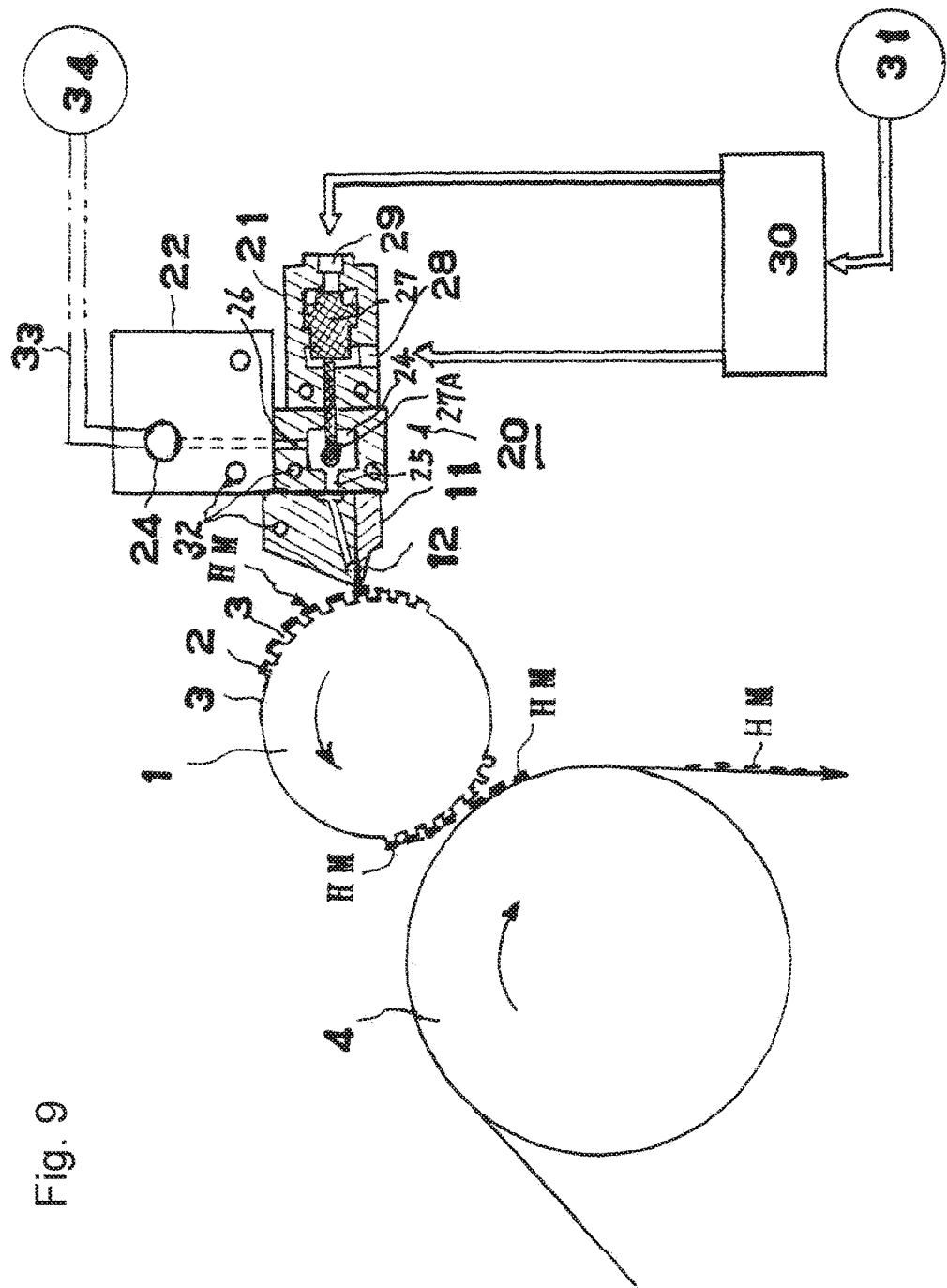
FIG. 9 is a schematic view of a roller transfer application device for a hot-melt adhesive, showing the second embodiment of the invention of the present patent application.
Figure 10:
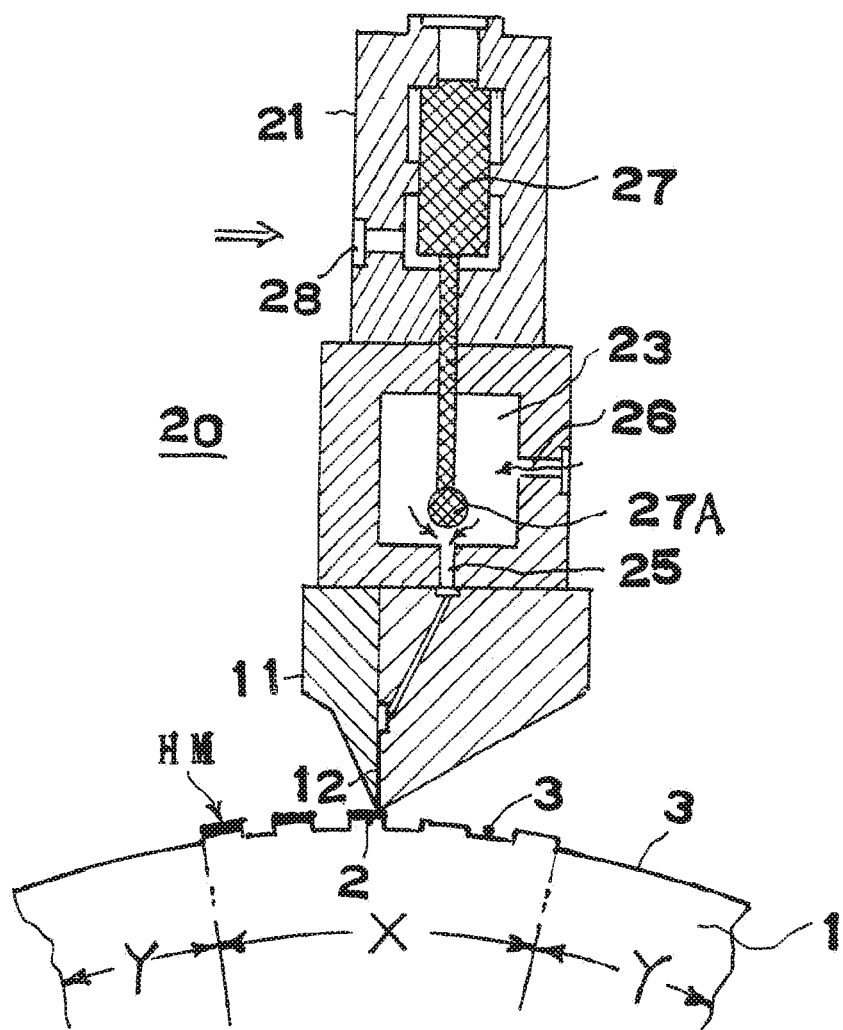
FIG. 10 is a longitudinal sectional view of a hot-melt adhesive controller in ON actuation.
Figure 11:
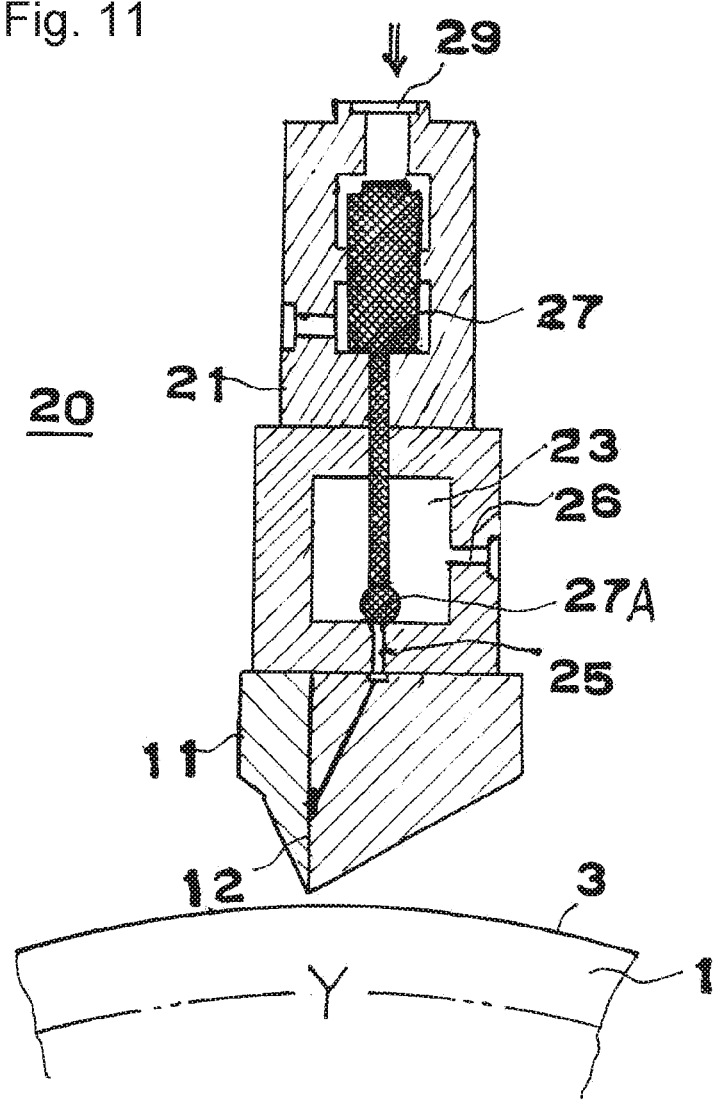
FIG. 11 is a longitudinal sectional view of the hot-melt adhesive controller in OFF actuation.

With reference to FIGS. 9 to 11, the ON/OFF hot-melt adhesive feed valve 20 will be described.

A gun module 21 and a manifold 22 are attached to a coater head 11 as shown in the figure, and the hot-melt adhesive fed to a heating hose receiving hole 24 of the manifold 22 is fed to the coater head 11 via a passage 25 and a passage 26. A valve element 27 is included in a valve chest 23 of the gun module 21. Consequently, communication between the passage 26 and the passage 25 is openable and closable by movement of the valve element 27.

A valve element action portion 27A is inserted into the valve chest 23 of the gun module 21, and a closing (OFF) operation air intake port 28 and an opening (ON) operation air intake port 29 are provided in an upper portion of the gun module 21. A heater 32 is mounted to each of the coater head 11, the gun module 21, and the manifold 22, and the fed hot-melt adhesive is heated to the set temperature range. In FIG. 9, a heating hose is denoted by reference sign 33, and a hot-melt adhesive feed source (including a hot-melt adhesive tank and a feed pump) is denoted by reference sign 34.

A solenoid valve 30 controls feeding of operating air to the closing (OFF) operation air intake port 28 and the opening (ON) operation air intake port 29 from an operating air source 31.

Figure 12:
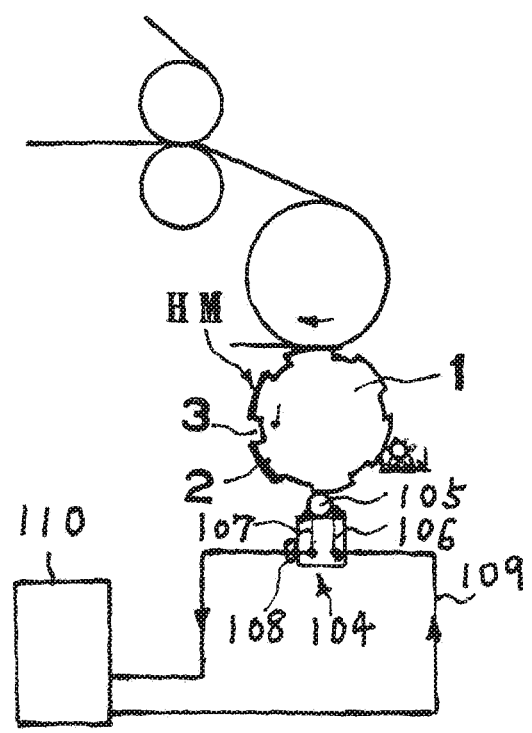
FIG. 12 is a schematic view similar to FIG. 1 of a known roller transfer application device for a hot-melt adhesive.

FIG. 12 shows a state in which the hot-melt adhesive is fed by opening (ON) actuation of the ON/OFF hot-melt adhesive feed valve 20, and FIG. 13 shows a state in which the feeding of the hot-melt adhesive is stopped by closing (OFF) actuation of the ON/OFF hot-melt adhesive feed valve 20.

The opening (ON) actuation is performed corresponding to the application zone of the pattern roller by computer-controlling the solenoid valve 30. Consequently, the hot-melt adhesive is fed at the timing of the application zone X to face the coater head.

Even when each of the protrusion surfaces 2 is a square surface of 5 mm×5 mm or a circle surface of 5 mm Φ, the application zone X becomes 10 cm or more, and thereby the first embodiment is applied. Consequently, it becomes possible to apply the hot-melt adhesive only to the protrusion surfaces.

By stopping the feed of the hot-melt adhesive from the coater head in the roller transfer application to the applied area (non-application zone Y) where only the recess surface exists and feeding the hot-melt adhesive from the coater head in the roller transfer application to the applied area (application zone X) where the recess surfaces and the protrusion surfaces are mixed, it is possible to apply the hot-melt adhesive in thin film states only to the protruding faces to thereby obtain a desired application face.

Further, there is an effect of enabling stable application for a long period of time with the application amount once set, and in the case of changing the application amount, enabling an easy change of the application amount by change of an adhesive feed pressure.

Moreover, the hot-melt adhesive can be fed only to the protrusion pattern surfaces of the pattern roller only with the application means by the coater head, without the necessity of a smoother roller and other additional devices. Thereby, there is an effect of facilitating cost reduction and maintenance by simplification of the device.

INDUSTRIAL APPLICABILITY

The invention of the present patent application prevents dispersion of a hot-melt adhesive when the hot-melt adhesive is applied to a pattern roller face of a design coating application device of the related art, in a manufacturing system for fluid absorber products (sanitary napkins, disposal diapers, and the like), and contributes to improvement of a work environment and also development of manufacturing of this type of application device.

The invention claimed is:

1. A roller transfer application method for a hot-melt adhesive, the method comprising:
providing a pattern roller, which has a patterned surface including a plurality of protrusion surfaces, and a coater head, which is coupled to a hot-melt adhesive feeder and has a slot groove that extends in an axial direction of the pattern roller and has an opening facing the pattern surface of the pattern roller;
feeding the hot-melt adhesive from the hot-melt adhesive feeder into the coater head;
feeding, in a thin film state, the hot-melt adhesive directly from the opening of the slot groove only onto the plurality of protrusion surfaces of the pattern roller; and
transferring the hot-melt adhesive from the plurality of the protrusion surfaces to a surface of an application substrate.

2. The roller transfer application method according to claim 1, wherein a clearance between the plurality of protrusion surfaces of the pattern roller and the opening of the slot groove is between 0.015 mm to 0.05 mm.

3. The roller transfer application method according to claim 1, wherein the pattern surface of the pattern roller has an application zone corresponding to at least one protrusion surface of the plurality of protrusion surfaces and at least one recess defined by the plurality of protrusion surfaces and has a non-application zone without protrusion surfaces of the plurality of protrusion surfaces, and further comprising:
providing an ON/OFF hot-melt adhesive feed control valve;
actuating the ON/OFF hot-melt adhesive feed control valve to feed the hot-melt adhesive to the coater head when the opening of the slot groove is facing the application zone of the pattern roller; and
actuating the ON/OFF hot-melt adhesive feed control valve to not feed the hot-melt adhesive to the coater head when the opening of the slot groove is facing the non-application zone of the pattern roller.

4. The roller transfer application method according to claim 1, further comprising feeding the hot-melt adhesive through the coater head to the opening of the slot groove.

5. The roller transfer application method according to claim 1, wherein a width of the slot groove is 0.2 mm, wherein a height of least one protrusion surface of the plurality of protrusion surfaces is 1 mm, and wherein the plurality of protrusion surfaces have a linear shape, have a square shape, have an 'S' shape, or a combination thereof.

6. The roller transfer application method according to claim 1, wherein feeding the hot-melt adhesive directly from the opening of the slot groove forms a layer of hot-melt adhesive having a thickness of 5 microns to 30 microns on at least one protrusion surface of the plurality of protrusion surfaces of the pattern roller.

7. A roller transfer application method for a hot-melt adhesive, the method comprising:
feeding the hot-melt adhesive from a hot-melt adhesive feeder to a coater head, wherein the coater head comprises a slot groove that extends in an axial direction of a pattern roller and the slot groove defines an opening facing the pattern roller, and wherein the hot-melt adhesive accumulates in the slot groove;
dispensing, in a thin film state, the hot-melt adhesive directly from the opening of the slot groove to only a plurality of protrusion surfaces of the pattern roller; and
transferring the hot-melt adhesive from the plurality of protrusion surfaces to a surface of an application substrate.

8. The roller transfer application method according to claim 7, further comprising feeding the hot-melt adhesive through the coater head to the slot groove to accumulate the hot-melt adhesive in the slot groove.

9. The roller transfer application method according to claim 7, wherein a clearance between the opening of the slot groove and at least one protrusion surface of the plurality of protrusion surfaces of the pattern roll is 0.015 mm to 0.05 mm.

10. The roller transfer application method according to claim 7, wherein a width of the opening of the slot groove is 0.2 mm, and wherein the width of the opening of the slot groove is configured such that hot-melt adhesive is only fed to the plurality of protrusion surfaces.

11. The roller transfer application method according to claim 7, wherein dispensing the hot-melt adhesive forms a layer of hot-melt adhesive having a thickness of 5 microns to 30 microns on at least one protrusion surface of the plurality of protrusion surfaces of the pattern roller.

* * * * *